(12) United States Patent
Kaneko et al.

(10) Patent No.: US 6,862,321 B2
(45) Date of Patent: Mar. 1, 2005

(54) METHOD AND APPARATUS FOR GENERATING TRANSMISSION SIGNAL BY PROCESSING WHICH INCLUDES DIGITAL QUADRATURE MODULATION

(75) Inventors: Keiichi Kaneko, Atsugi (JP); Kazunari Matsui, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 716 days.

(21) Appl. No.: 09/804,396

(22) Filed: Mar. 13, 2001

(65) Prior Publication Data

US 2001/0028687 A1 Oct. 11, 2001

(30) Foreign Application Priority Data

Apr. 3, 2000 (JP) ........................................ 2000-100443

(51) Int. Cl.[7] .......................... H04L 25/49; H04L 27/28; H04K 1/10
(52) U.S. Cl. ........................................ 375/296; 375/260
(58) Field of Search ................................ 375/261, 279, 375/280, 281, 284, 296, 298, 308, 260; 332/103; 370/206, 207; 455/63.1

(56) References Cited

U.S. PATENT DOCUMENTS

| | | | |
|---|---|---|---|
| 4,626,803 A | | 12/1986 | Holm |
| 5,237,292 A | * | 8/1993 | Chethik ........................ 375/261 |
| 5,351,016 A | | 9/1994 | Dent |
| 5,663,691 A | * | 9/1997 | Kowalik et al. ............. 332/103 |
| 5,886,584 A | * | 3/1999 | Tanai et al. .................. 332/103 |
| 6,151,296 A | * | 11/2000 | Vijayan et al. .............. 375/340 |
| 6,442,211 B1 | * | 8/2002 | Hampel et al. ............. 375/260 |
| 6,512,800 B1 | * | 1/2003 | Amir et al. .................. 375/296 |

FOREIGN PATENT DOCUMENTS

| | | |
|---|---|---|
| EP | 0441110 | 8/1991 |
| JP | 8-102766 | 4/1996 |
| WO | WO 98/20657 | 5/1998 |

OTHER PUBLICATIONS

Keller T. et al, "Sub-Band Adaptive Pre-Equalised OFDM Transmission", Vehicular Technology Conference, 1999. IEEE VTS 50th Amsterdam, Netherlands Sep. 19–22, 1999 pp 334–338.

* cited by examiner

*Primary Examiner*—Betsy L. Deppe
(74) *Attorney, Agent, or Firm*—Louis Woo (57) ABSTRACT

Non-compensation signal points are determined in a two-dimensional plane without considering a signal error caused by digital quadrature modulation. The two-dimensional plane is defined by a real axis and an imaginary axis. The real axis corresponds to real-part signal components. The imaginary axis corresponds to imaginary-part signal components. Compensation signal points are determined in the two-dimensional plane in response to a signal error caused by digital quadrature modulation if the non-compensation signal points are used. The non-compensation signal points and the compensation signal points are point-symmetry. Digital information signal pieces are sequentially assigned to one of the compensation signal points in response to contents of the digital information signal pieces. The digital information pieces are subjected to a modulation process including digital quadrature modulation in response to the above-mentioned assignment to generate a radio-frequency transmission signal.

7 Claims, 7 Drawing Sheets

METHOD AND APPARATUS FOR GENERATING TRANSMISSION SIGNAL BY PROCESSING WHICH INCLUDES DIGITAL QUADRATURE MODULATION

BACKGROUND OF THE INVENTION

1. Field of the Invention

This invention relates to a method of generating a transmission signal by processing which includes digital quadrature modulation. Also, this invention relates to an apparatus for generating a transmission signal by processing which includes digital quadrature modulation.

2. Description of the Related Art

Japanese patent application publication number 8-102766 discloses digital quadrature modulators in which an I-channel (in-phase channel) carrier is regarded as a repetitive data sequence of "1"→"0"→"−1"→"0", and a Q-channel (quadrature channel) carrier is regarded as a repetitive data sequence of "0"→"1"→"0"→"−1". A digital I-channel information signal is sequentially multiplied by the I-channel carrier data sequence, while a digital Q-channel information signal is sequentially multiplied by the Q-channel carrier data sequence. A signal generated by the multiplication in the I-channel and a signal generated by the multiplication in the Q channel are multiplexed into a digital-quadrature-modulation result signal.

In the case where samples of the digital I-channel information signal and samples of the digital Q-channel information signal are synchronized with each other, the 90-degree ($\pi/2$) phase difference between the I-channel and Q-channel carrier data sequences causes a timing phase difference between the I-channel components and the Q-channel components of the digital-quadrature-modulation result signal. Such a timing phase difference adversely affects signal transmission.

Japanese application 8-102766 discloses that digital filters are provided respectively in I-channel and Q-channel signal flow paths before a stage for multiplexing the digital I-channel and Q-channel information signals by the I-channel and Q-channel carrier data sequences. The I-channel and Q-channel digital filters are designed to provide different signal phases to compensate for the timing phase difference between the I-channel components and the Q-channel components of the digital-quadrature-modulation result signal.

The I-channel and Q-channel digital filters in Japanese application 8-102766 are required to implement accurate operation. In addition, the I-channel and Q-channel digital filters have complicated structures, and are hence expensive.

SUMMARY OF THE INVENTION

It is a first object of this invention to provide an improved method of generating a transmission signal by processing which includes digital quadrature modulation.

It is a second object of this invention to provide an improved apparatus for generating a transmission signal by processing which includes digital quadrature modulation.

A first aspect of this invention provides a method of generating a transmission signal. The method comprises the steps of determining non-compensation signal points in a two-dimensional plane without considering a signal error caused by digital quadrature modulation, the two-dimensional plane being defined by a real axis and an imaginary axis, the real axis corresponding to real-part signal components, the imaginary axis corresponding to imaginary-part signal components; determining compensation signal points in the two-dimensional plane in response to a signal error caused by digital quadrature modulation if the non-compensation signal points are used, the non-compensation signal points and the compensation signal points being point-symmetry; sequentially assigning digital information signal pieces to one of the compensation signal points in response to contents of the digital information signal pieces; and subjecting the digital information pieces to a modulation process including digital quadrature modulation in response to the assignment given by the assigning step to generate a radio-frequency transmission signal.

A second aspect of this invention is based on the first aspect thereof, and provides a method wherein the compensation signal points provide compensation for an error in the radio-frequency transmission signal which is caused by one of a phase difference between an in-phase signal and a quadrature signal, an amplitude difference between the in-phase signal and the quadrature signal, and an error in a quadrature relation between the in-phase signal and the quadrature signal.

A third aspect of this invention is based on the first aspect thereof, and provides a method wherein the compensation signal points provide compensation for an error in the radio-frequency transmission signal which is caused by a timing difference between an in-phase signal and a quadrature signal.

A fourth aspect of this invention provides a method of generating a transmission signal. The method comprises the steps of determining first non-compensation signal points in a two-dimensional plane without considering a signal error caused by digital quadrature modulation, the two-dimensional plane being defined by a real axis and an imaginary axis, the real axis corresponding to real-part signal components, the imaginary axis corresponding to imaginary-part signal components; determining second non-compensation signal points in the two-dimensional plane without considering the signal error caused by digital quadrature modulation; determining first compensation signal points in the two-dimensional plane for a first subcarrier in response to a signal error caused by digital quadrature modulation if the first non-compensation signal points are used, the first non-compensation signal points and the first compensation signal points being point-symmetry; determining second compensation signal points in the two-dimensional plane for a second subcarrier in response to a signal error caused by digital quadrature modulation if the second non-compensation signal points are used, the second non-compensation signal points and the second compensation signal points being point-symmetry, the second subcarrier being equal in frequency to the first subcarrier and being different in polarity from the first subcarrier; sequentially assigning first digital information signal pieces to one of the first compensation signal points in response to contents of the first digital information signal pieces; sequentially assigning second digital information signal pieces to one of the second compensation signal points in response to contents of the second digital information signal pieces; and subjecting the first digital information pieces and the second digital information pieces to a modulation process including digital quadrature modulation in response to the assignments given by the assigning steps to generate a radio-frequency transmission signal containing the first and second subcarriers.

A fifth aspect of this invention provides an apparatus for generating a transmission signal. The apparatus comprises means for determining non-compensation signal points in a two-dimensional plane without considering a signal error caused by digital quadrature modulation, the two-dimensional plane being defined by a real axis and an imaginary axis, the real axis corresponding to real-part signal components, the imaginary axis corresponding to imaginary-part signal components; means for determining compensation signal points in the two-dimensional plane in response to a signal error caused by digital quadrature modulation if the non-compensation signal points are used, the non-compensation signal points and the compensation signal points being point-symmetry; means for sequentially assigning digital information signal pieces to one of the compensation signal points in response to contents of the digital information signal pieces; and means for subjecting the digital information pieces to a modulation process including digital quadrature modulation in response to the assignment given by the assigning means to generate a radio-frequency transmission signal.

A sixth aspect of this invention provides an apparatus for generating a transmission signal. The apparatus comprises first means for storing information representing assignment of states of a signal piece to signal points predetermined in response to an estimated signal error caused by digital quadrature modulation in the absence of correction; second means for assigning an input information signal piece to one of the signal points in response to a state of the input information signal piece according to the information stored in the first means to convert the input information signal piece into first and second baseband signal pieces; and third means for subjecting the first and second baseband signal pieces generated by the second means to a modulation process including digital quadrature modulation to convert the first and second baseband signal pieces into a piece of a modulation-resultant transmission signal from which a signal error caused by the digital quadrature modulation is removed.

DETAILED DESCRIPTION OF THE INVENTION

Figure 1:
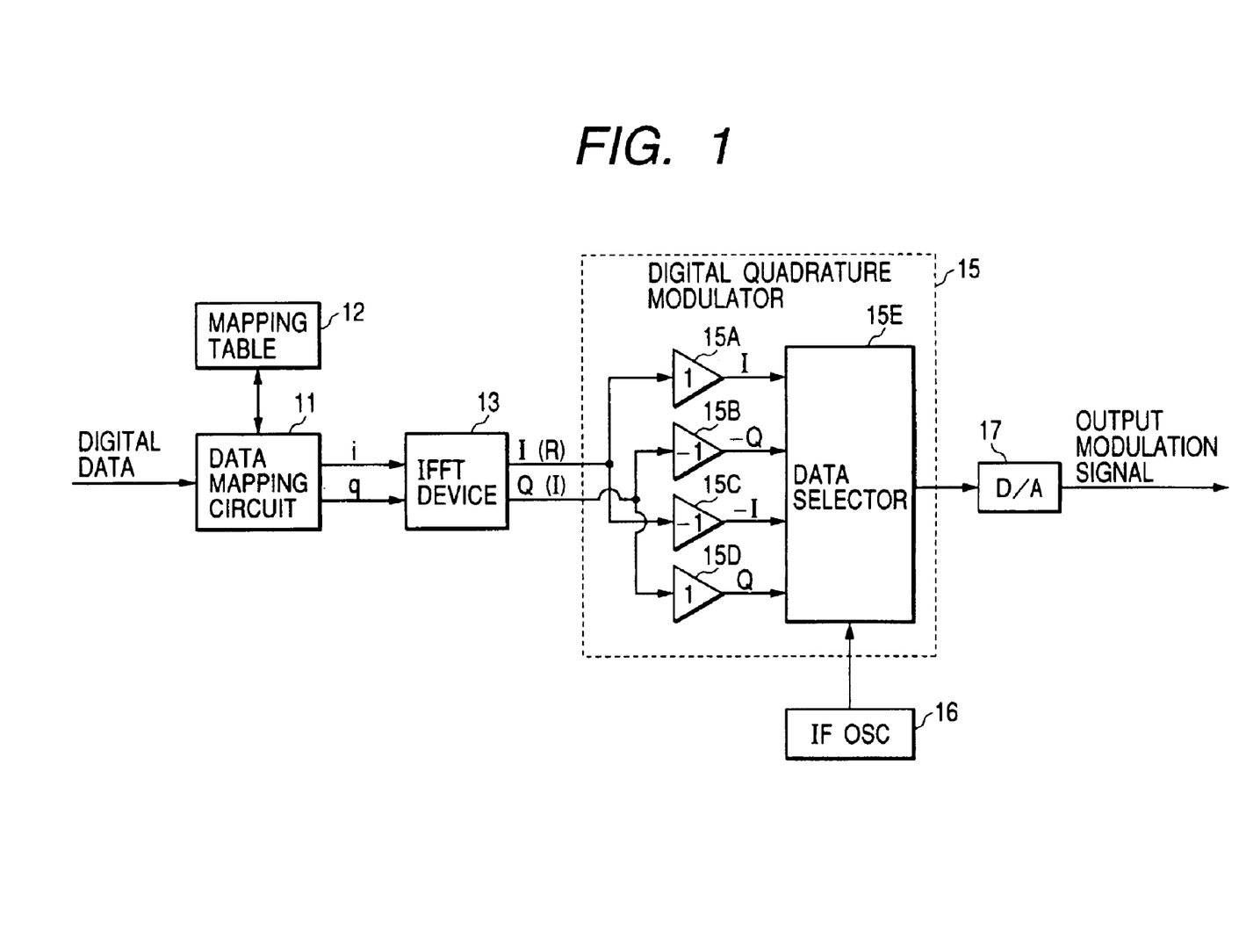
FIG. 1 is a block diagram of an OFDM (orthogonal frequency division multiplexing) modulation apparatus according to an embodiment of this invention.

FIG. 1 shows an OFDM (orthogonal frequency division multiplexing) modulation apparatus according to an embodiment of this invention.

The apparatus of FIG. 1 includes a data mapping circuit 11, a mapping table 12, an IFFT (inverse fast Fourier transform) device 13, a digital quadrature modulator 15, an intermediate-frequency oscillator 16, and a D/A (digital-to-analog) converter 17. The data mapping circuit 11, the IFFT device 13, the digital quadrature modulator 15, and the D/A converter 17 are sequentially connected in that order. The mapping table 12 is provided in a memory connected to the data mapping circuit 11. The intermediate-frequency oscillator 16 is connected to the digital quadrature modulator 15.

The data mapping circuit 11 receives input digital data to be transmitted. The data mapping circuit 11 converts the input digital data into digital I (in-phase) signals "i" and digital Q (quadrature) signals "q" in response to the contents of the mapping table 12. Specifically, the data mapping circuit 11 cyclically assigns successive segments of the input digital data to pairs of subcarriers of an OFDM signal, respectively. The mapping table 12 contains information indicating signal points of QPSK-resultant (quadrature phase shift keying resultant) subcarriers, QAM-resultant (quadrature amplitude modulation resultant) subcarriers, or BPSK-resultant (binary phase shift keying resultant) subcarriers. The signal points are defined in an amplitude-angle plane. As will be made clear later, the signal points are predetermined so as to compensate for a signal error caused by the quadrature modulator 15. The mapping table 12 also contains information indicating each assignment of values which can be represented by a segment of the input digital data to signal points of a corresponding pair of QPSK-resultant subcarriers, QAM-resultant subcarriers, or BPSK-resultant subcarriers. The data mapping circuit 11 implements data mapping on the segments of the input digital data in accordance with the contents of the mapping table as follows. Specifically, the data mapping circuit 11 assigns every segment of the input digital data to one of corresponding signal points in response to the value represented by the segment of the input digital data by referring to the contents of the mapping table 12. In other words, for every segment of the input digital data, the data mapping circuit 11 selects one from among corresponding signal points in response to the value represented by the segment of the input digital data. The data mapping circuit 11 generates the digital signals "i" and the digital signals "q" on the basis of the amplitude-direction coordinates and the angle-direction coordinates of the assigned signal points (the selected signal points). The data mapping circuit 11 feeds the digital signals "i" and the digital signals "q" to the IFFT device 13. The digital signals "i" and the digital signals "q" are arranged in a virtual frequency domain so that they can be properly assigned to frequencies (orthogonal baseband subcarrier frequencies) for IFFT.

The IFFT device 13 implements IFFT (inverse fast Fourier transform) while setting the digital signals "i" as real-part terms and setting the digital signals "q" as imaginary-part terms. The IFFT device 13 converts and combines the digital signals "i" into an IFFT-resultant digital I signal or an IFFT-resultant digital real-part signal. In addition, the IFFT device 13 converts and combines the digital signals "q" into an IFFT-resultant digital Q signal or an IFFT-resultant digital imaginary-part signal. The IFFT device 13 outputs the IFFT-resultant digital I and Q signals to the digital quadrature modulator 15. The IFFT device 13 includes an n-point IFFT circuit, where "n" denotes a predetermined natural number.

The digital quadrature modulator 15 includes multipliers 15A, 15B, 15C, and 15D, and a data selector 15E. The multipliers 15A, 15B, 15C, and 15D follow the IFFT device 13. The data selector 15E follows the multipliers 15A, 15B, 15C, and 15D. The data selector 15E is connected to the intermediate-frequency oscillator 16 and the D/A converter 17.

The multiplier 15A receives the IFFT-resultant digital I signal from the IFFT device 13, and multiplies the IFFT-resultant digital I signal by "1". The multiplier 15A includes a buffer or an amplifier having a gain of 1. The multiplier 15A outputs the multiplication-resultant digital signal "I" to the data selector 15E. The multiplier 15B receives the IFFT-resultant digital Q signal from the IFFT device 13, and multiplies the IFFT-resultant digital Q signal by "−1". The multiplier 15B includes an inverter. The multiplier 15B outputs the multiplication-resultant digital signal "−Q" to the data selector 15E. The multiplier 15C receives the IFFT-resultant digital I signal from the IFFT device 13, and multiplies the IFFT-resultant digital I signal by "−1". The multiplier 15C includes an inverter. The multiplier 15C outputs the multiplication-resultant digital signal "−I" to the data selector 15E. The multiplier 15D receives the IFFT-resultant digital Q signal from the IFFT device 13, and multiplies the IFFT-resultant digital Q signal by "1". The multiplier 15D includes a buffer or an amplifier having a gain of 1. The multiplier 15D outputs the multiplication-resultant digital signal "Q" to the data selector 15E.

The intermediate-frequency oscillator 16 acts as a local oscillator. The intermediate-frequency oscillator 16 includes a clock signal generator for producing a clock signal having a predetermined frequency. Preferably, the frequency of the clock signal is equal to a predetermined integer multiple of (for example, four times) the frequency of virtual analog sine and cosine waves for quadrature modulation. The intermediate-frequency oscillator 16 feeds the clock signal to the data selector 15E.

The data selector 15E sequentially and cyclically selects one from among the output digital signals of the multipliers 15A, 15B, 15C, and 15D in response to the clock signal fed from the intermediate-frequency oscillator 16. The selection order in every cycle is as follows: "I" (the output digital signal of the multiplier 15A), "−Q" (the output digital signal of the multiplier 15B), "−I" (the output digital signal of the multiplier 15C), and "Q" (the output digital signal of the multiplier 15D). The data selector 15E outputs the selection-resultant digital signal to the D/A converter 17.

The multipliers 15A–15D and the data selector 15E cooperate to implement digital quadrature modulation which combines the IFFT-resultant digital I and Q signals into a single quadrature-modulation-resultant digital signal (the output digital signal from the data selector 15E). The digital quadrature modulation virtually uses a digital sine wave and a digital cosine wave having a frequency corresponding to the cycle of the signal selection by the data selector 15E. The digital sine wave periodically changes as "0"→"1"→"0"→"−1". The digital cosine wave periodically changes as "1"→"0"→"−1"→"0". The digital sine wave results from periodically sampling the virtual analog sine wave at a prescribed frequency. The digital cosine wave results from periodically sampling the virtual analog cosine wave at the prescribed frequency. The multiplications by the multipliers 15A–15D correspond to the multiplications among the IFFT-resultant digital I and Q signals, the digital sine wave, and the digital cosine wave for the digital quadrature modulation. For every cycle, the data selector 15E sequentially selects the output digital signals from the multipliers 15A–15D in the order of "I→−Q→−I→Q".

The D/A converter 17 changes the output digital signal of the digital quadrature modulator 15, that is, the output digital signal of the data selector 15E, into a corresponding analog multiple-carrier signal (a corresponding analog OFDM signal) whose center frequency is equal to the frequency of the sine and cosine waves used in the digital quadrature modulator 15. The D/A converter 15 outputs the analog multiple-carrier signal.

The contents of the mapping table 12 include corrective data for previously correcting the error of the actual characteristics of the digital quadrature modulator 15 from the desired characteristics. The data mapping by the data mapping circuit 11 in responsive to the corrective-data-added mapping table 12 means that non-corrected mapping-resultant signals are revised in response to the corrective data. The revision-resultant signals are used for generating the digital signals "i" and the digital signals "q".

The analog multiple-carrier signal (the analog OFDM signal) outputted from the D/A converter 15 is fed via a frequency up-conversion stage to a receiving apparatus as a transmission signal while being propagated along a transmission line. The receiving apparatus demodulates the analog multiple-carrier signal into signal-point information pieces. The receiving apparatus recovers the original digital data from the signal-point information pieces.

Figure 2:
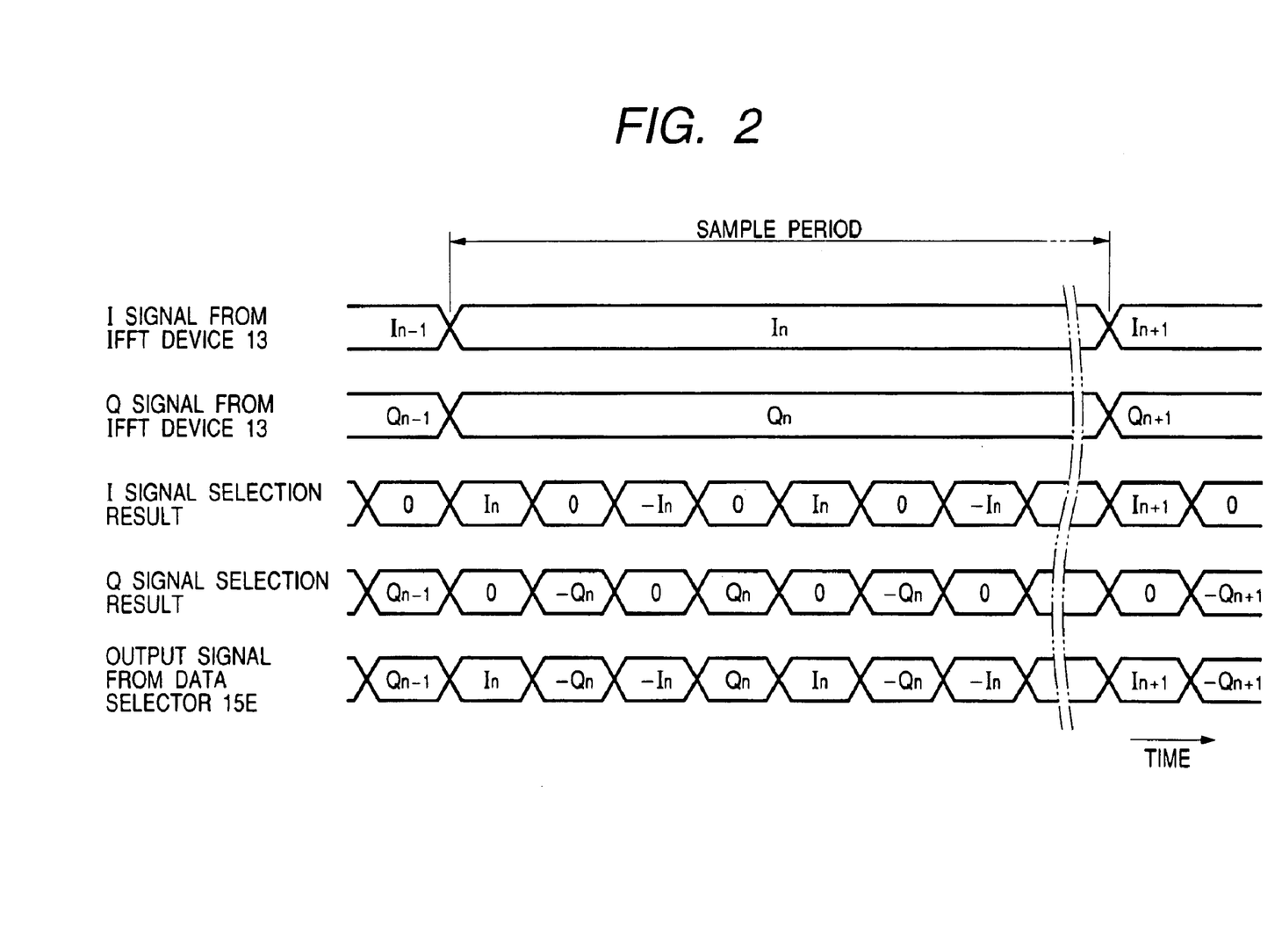
FIG. 2 is a time-domain diagram of a first example of signals in the apparatus of FIG. 1.

As shown in FIG. 2, the IFFT-resultant digital I signal outputted from the IFFT device 13 has a sequence of time-domain variable samples . . . , $I_{n-1}$, $I_n$, $I_{n+1}$, . . . . Similarly, the IFFT-resultant digital Q signal outputted from the IFFT device 13 has a sequence of time-domain variable samples . . . , $Q_{n-1}$, $Q_n$, $Q_{n+1}$, . . . . The period of samples of the IFFT-resultant digital I signal and the period of samples of the IFFT-resultant digital Q signal correspond to a sampling frequency related to the OFDM signal. The sample period has a given relation with the window interval for operating the n-point IFFT circuit in the IFFY device 13. Specifically, the sample period corresponds to the window interval divided by "n".

During every sample period, the data selector 15E sequentially and cyclically selects "$I_n$" (the output digital signal of the multiplier 15A), "0", "−$I_n$" (the output digital signal of the multiplier 15C), and "0". Thus, regarding the IFFT-resultant digital I signal, the data selector 15E generates the recurrence of "$I_n$", "0", "−$I_n$", and "0". During every sample period, the data selector 15E sequentially and cyclically selects "0", "−$Q_n$" (the output digital signal of the multiplier 15B)", "0", and "$Q_n$" (the output digital signal of the multiplier 15D). Thus, regarding the IFFT-resultant digital Q signal, the data selector 15E generates the recurrence of "0", "−$Q_n$", "0", and "$Q_n$". The data selector 15E combines the recurrence of "$I_n$", "0", "−$I_n$", and "0" and the recurrence of "0", "−$Q_n$", "0", and "$Q_n$" into the recurrence of "$I_n$", "−$Q_n$", "−$I_n$", and "Qn". The data selector 15E outputs the recurrence of "$I_n$", "−$Q_n$", "−$I_n$", and "Qn" as a modulation-resultant digital signal.

With reference to FIG. 2, at the start of every sample period, the real-part component "$I_n$" of the modulation-resultant digital signal (that is, the output signal from the data selector 15E) precedes the imaginary-part component "−Qn" thereof. Accordingly, there would be a timing difference or a phase difference between the real-part components and the imaginary-part components of the modulation-resultant digital signal.

The data mapping circuit 11 and the mapping table 12 (see FIG. 1) are designed to compensate for such a timing difference (or phase difference). Specifically, the mapping table 12 contains predetermined data mapping information predetermined in response to an estimated timing difference between the real-part components and the imaginary-part components of the modulation-resultant digital signal generated by the digital quadrature modulator 15 in the absence of correction or compensation. The data mapping circuit 11 accesses the mapping table 12, and converts the input digital data into the digital signals "i" and the digital signals "q" by referring to the contents of the mapping table 12 (that is, the data mapping information in the mapping table 12). The digital signal "i" and the digital signal "q" provide compensation for the actual phase difference between the real-part components and the imaginary-part components of the modulation-resultant digital signal generated by the digital quadrature modulator 15. The data mapping circuit 11 feeds the digital signal "i" and the digital signal "q" to the IFFT device 13.

The timing difference or the phase difference between the real-part components and the imaginary-part components of the modulation-resultant digital signal generated by the digital quadrature modulator 15 corresponds to a timing error between the virtual sine wave and the virtual cosine wave used in the digital quadrature modulator 15, that is, an error in the quadrature relation between I and Q signal vectors with respect to the modulation-resultant digital signal. The modulation-resultant digital signal has components (subcarriers) in upper and lower side bands of the intermediate frequency set by the intermediate-frequency oscillator 16. There are pairs of the upper-side-band signal components and the lower-side-band signal components. The upper-side-band signal component and the lower-side-band signal component in each pair (that is, the upper-side-band subcarrier and the lower-side-band subcarrier in each pair) are located at respective frequency points equidistant from the intermediate frequency. The above-indicated error in the quadrature relation would cause crosstalk between the upper-side-band signal component and the lower-side-band signal component in each pair. The crosstalk would adversely alter the frequency spectrum of the modulation-resultant digital signal.

The data mapping circuit 11 and the mapping table 12 implement data mapping which is designed to compensate for such crosstalk. Specifically, the data mapping is designed to correct the upper-side-band subcarrier and the lower-side-band subcarrier in each pair.

The data mapping will be described below in more detail. Signal points are expressed by the coordinates in a complex plane. The data mapping uses signal points resulting from correction of original signal points. For example, an original signal point at the coordinates of (1, 1) is corrected into a second signal point at the coordinates of (1+x, 1+y) where "x" and "y" denote real-part and imaginary-part corrective quantities respectively.

The upper-side-band subcarrier and the lower-side-band subcarrier in each pair are defined as a positive-frequency subcarrier and a negative-frequency subcarrier, respectively. For the positive-frequency subcarrier and the negative-frequency subcarrier in each pair, the corresponding before-correction signal point (the original signal point) is expressed by the values d1, d2, d3, and d4 which denote the real-part value for the positive-frequency subcarrier, the imaginary-part value for the positive-frequency subcarrier, the real-part value for the negative-frequency subcarrier, and the imaginary-part value for the negative-frequency subcarrier, respectively. For example, in the case of QPSK, each of the values d1, d2, d3, and d4 assumes "+1" or "−1". The data mapping reflects correction of the values d1, d2, d3, and d4 into the values d1+x, d2+y, d3+x', and d4+y', respectively. Here, x, y, x', and y' denote corrective quantities or corrective values.

Figure 3:
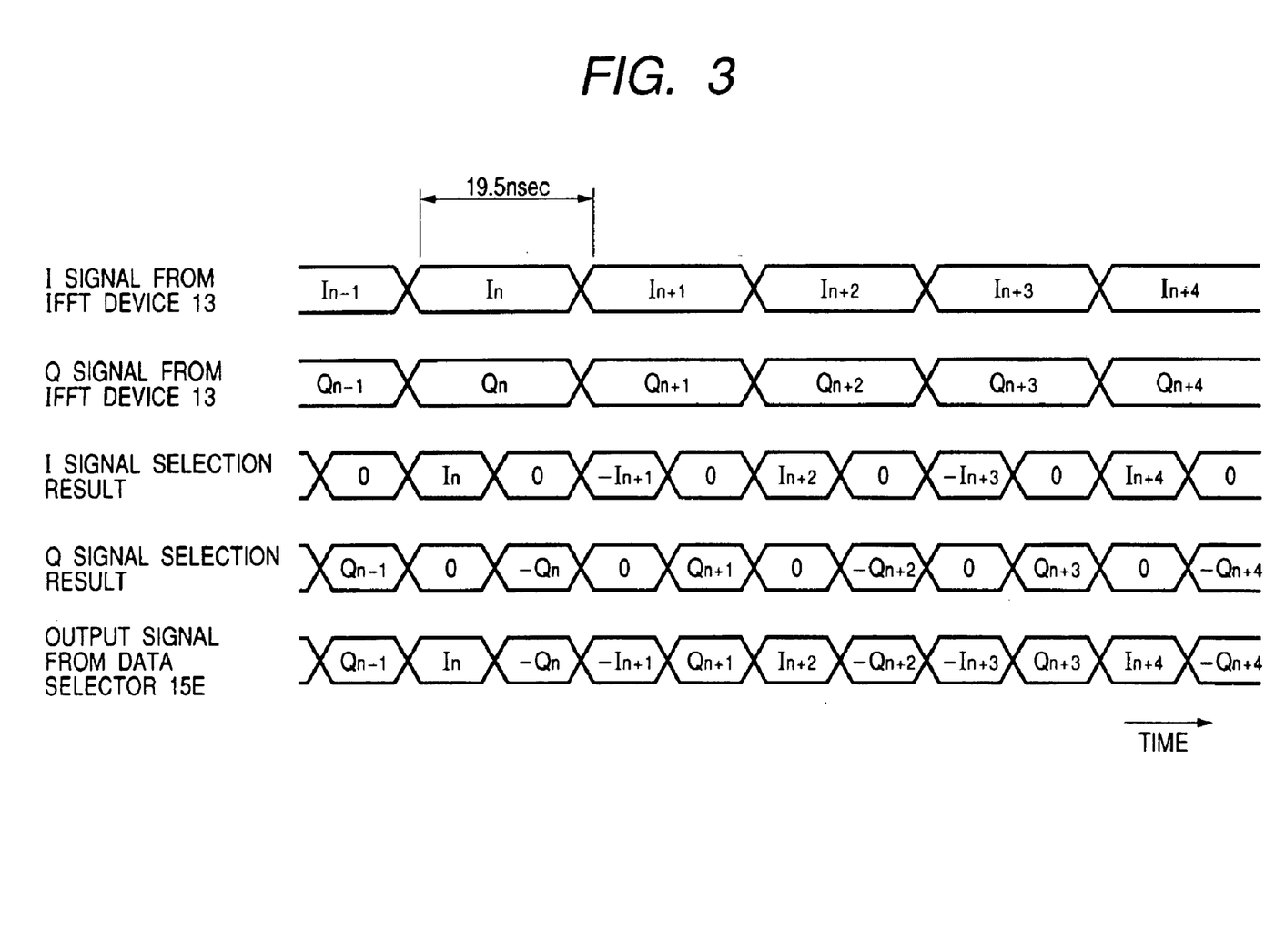
FIG. 3 is a time-domain diagram of a second example of signals in the apparatus of FIG. 1.

FIG. 3 shows an example of time-domain states of the IFFT-resultant digital I signal outputted from the IFFT device 13, the IFFT-resultant digital Q signal outputted from the IFFT device 13, the result of the I signal selection by the data selector 15E, the result of the Q signal selection by the data selector 15E, and the modulation-resultant digital signal outputted from the data selector 15E which occur under conditions as follows. The sample period of the IFFT-resultant digital I and Q signals is equal to 19.5 nsec. Thus, the sample frequency of the IFFT-resultant digital I and Q signals is equal to 51.2 MHz. The period of the signal selection by the data selector 15E is equal to a half of the sample period of the IFFT-resultant digital I and Q signals. Thus, the sample frequency of the modulation-resultant digital signal is equal to 102.4 MHz. The intermediate frequency set by the intermediate-frequency oscillator 16 is equal to 25.6 MHz.

With reference to FIG. 3, the IFFT-resultant digital I signal has a sequence of time-domain variable samples . . . , $I_{n-1}, I_n, I_{n+1}, \ldots$, Similarly, the IFFT-resultant digital Q has a sequence of time-domain variable samples . . . , $Q_{n-1}, Q_n, Q_{n+1}, \ldots$. Each of the samples of the IFFT-resultant digital I and Q signals has a direct-current component (a zero-frequency component) and alternating-current components having frequencies up to 16 MHz. The digital quadrature modulator 15 handles the IFFT-resultant digital I and Q signals as baseband signals. The digital quadrature modulator 15 converts the IFFT-resultant digital I and Q signals into a modulation-resultant digital signal of an intermediate-frequency band centered at 25.6 MHz. Specifically, the modulation-resultant digital signal extends over a frequency band of 25.6±16 MHz. In the absence of the correction by the data mapping circuit 11 and the mapping table 12, the quadrature relation between I and Q signal vectors with respect to the modulation-resultant digital signal would have an error of about 9.8 nsec (1/102.4 MHz). A pair of the 38.4-MHz subcarrier and the 12.8-MHz subcarrier which is higher and lower than the center frequency (25.6 MHz) by 12.8 MHz is taken as an example. The quadrature-relation error would cause the 38.4-MHz subcarrier to have a phase delay of π/4 radian. On the other hand, the quadrature-relation error would cause the 12.8-MHz subcarrier to have a phase advance of π/4 radian. The previously-mentioned corrective quantities used in the data mapping compensate for such phase delays and phase advances in the subcarriers.

Figure 4:
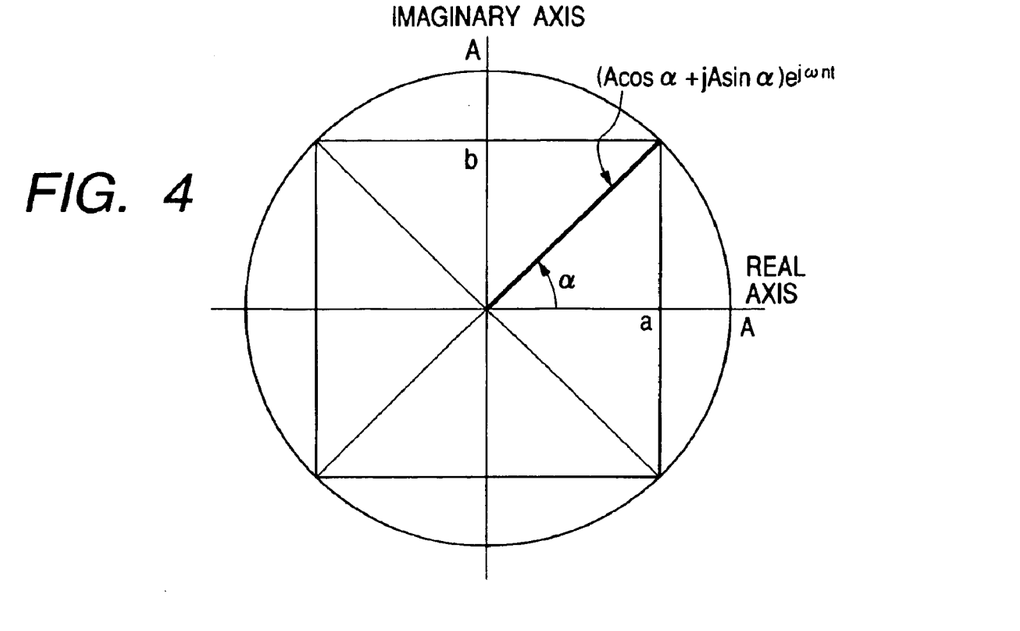
FIG. 4 is a diagram of a complex plane in which a state of a subcarrier is illustrated.

The corrective quantities (the corrective values) are expressed in a two-dimensional plane defined by the real axis and the imaginary axis. FIG. 4 illustrates a two-dimensional plane (a complex plane) defined by the real axis and the imaginary axis. In FIG. 4, there is shown a state of a subcarrier having a phase angle "α", an angular velocity "+$\omega_n$", and an amplitude "A". The subcarrier is expressed by the following equation.

$$A \cdot \cos(+\omega_n t + \alpha) + j \cdot A \cdot \sin(+\omega_n t + \alpha) \quad (1)$$

where "j" denotes an imaginary unit. For example, in the case of QPSK, the amplitude "A" is equal to √2, and the phase angle "α" assumes one of π/4, 3π/4, 5π/4, and 7π/4.

Similarly, a subcarrier having a phase angle "β", an angular velocity "−$\omega_n$", and an amplitude "B" is expressed by the following equation.

$$B \cdot \cos(-\omega_n t + \beta) + j \cdot B \cdot \sin(-\omega_n t + \beta) \quad (2)$$

For example, in the case of QPSK, the amplitude "B" is equal to √2, and the phase angle "β" assumes one of π/4, 3π/4, 5π/4, and 7π/4. The subcarrier having the angular velocity "$+\omega_n$" and the subcarrier having the angular velocity "$-\omega_n$" form a pair.

It is assumed that imaginary-part signals corresponding to the imaginary terms of the equations (1) and (2) have errors in amplitude and phase relative to real-part signals corresponding to the real terms of the equations (1) and (2). Specifically, the assumed amplitude error is equal to "$\lambda$" times while the assumed phase error is equal to "$\gamma$" radian. The error-containing subcarriers are expressed by the following equations.

$$A \cdot \cos(+\omega_n t+\alpha)+j \cdot \lambda \cdot A \cdot \sin(+\omega_n t+\alpha-\gamma) \quad (3)$$

$$B \cdot \cos(-\omega_n t+\beta)+j \cdot \lambda \cdot B \cdot \sin(-\omega_n t+\beta+\gamma) \quad (4)$$

The phase error "$\gamma$" corresponds to the previously-mentioned error equal to about 9.8 nsec, that is, the quadrature-relation error. As will be explained later, the data mapping compensates for the phase error "$\gamma$". In addition, the data mapping may compensate for the amplitude error "$\lambda$".

By using an exponential function, the equation (1) is rewritten as follows.

$$(a+j \cdot b) \cdot e^{j\omega_n t} \quad (5)$$

where $a=A \cdot \cos(\alpha)$, and $b=A \cdot \sin(\alpha)$. The equation (3) is rewritten as follows.

$$(\tfrac{1}{2})Ae^{j\alpha}e^{j\omega_n t}+(\tfrac{1}{2})Ae^{-j\alpha}e^{-j\omega_n t}+\lambda(\tfrac{1}{2})Ae^{j(\alpha-\gamma)}e^{j\omega_n t}-\lambda(\tfrac{1}{2})Ae^{-j(\alpha-\gamma)}e^{-j\omega_n t} \quad (6)$$

Similarly, the equation (4) is rewritten as follows.

$$(\tfrac{1}{2})Be^{j\beta}e^{-j\omega_n t}+(\tfrac{1}{2})Be^{-j\beta}e^{j\omega_n t}+\lambda(\tfrac{1}{2})Be^{j(\beta+\gamma)}e^{-j\omega_n t}-\lambda(\tfrac{1}{2})Be^{-j(\beta+\gamma)}e^{j\omega_n t} \quad (7)$$

Figure 5:
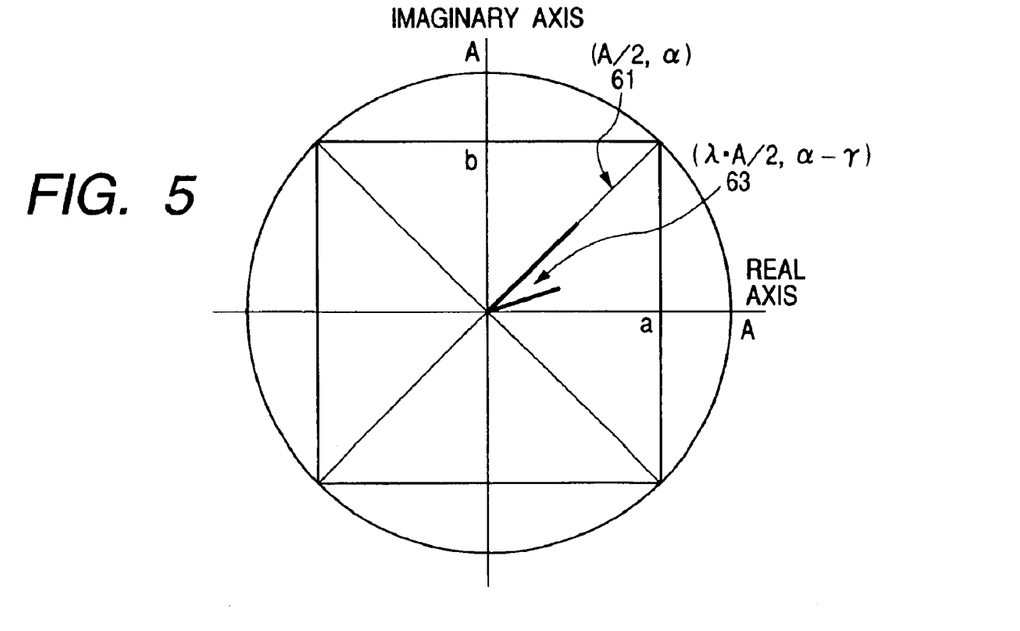
FIG. 5 is a diagram of a complex plane in which vectors corresponding to a subcarrier are illustrated.

The first and third terms in the equation (6) denote vectors 61 and 63 rotating at the angular velocity "$\omega_n t$" which are shown in FIG. 5. The first-term vector 61 in FIG. 5 has an amplitude "A/2" and an angle "$\alpha$" from the real axis. The third-term vector 63 in FIG. 5 has an amplitude "$\lambda \cdot A/2$" and an angle "$\alpha-\gamma$" from the real axis.

Figure 6:
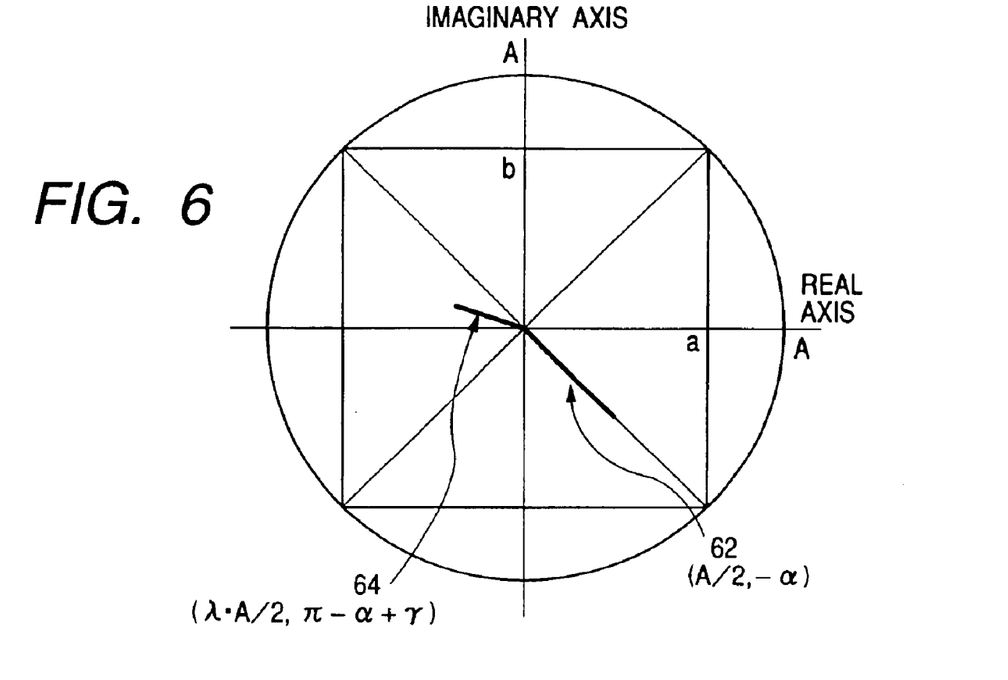
FIG. 6 is a diagram of a complex plane in which vectors corresponding to a subcarrier are illustrated.

The second and fourth terms in the equation (6) denote vectors 62 and 64 rotating at the angular velocity "$\omega_n t$" which are shown in FIG. 6. The second-term vector 62 in FIG. 6 has an amplitude "A/2" and an angle "$-\alpha$" from the real axis. The fourth-term vector 64 in FIG. 6 has an amplitude "$\lambda \cdot A/2$" and an angle "$-(\alpha-\gamma)$" from the real axis. The fourth-term vector 64 exists in the second quadrant of the two-dimensional plane.

The first-term vector 61 in FIG. 5 and the second-term vector 62 in FIG. 6 correspond to the real-part signal expressed by the first term of the equation (1), while the third-term vector 63 in FIG. 5 and the fourth-term vector 64 in FIG. 6 correspond to the imaginary-part signal expressed by the second term of the equation (1).

Figure 7:
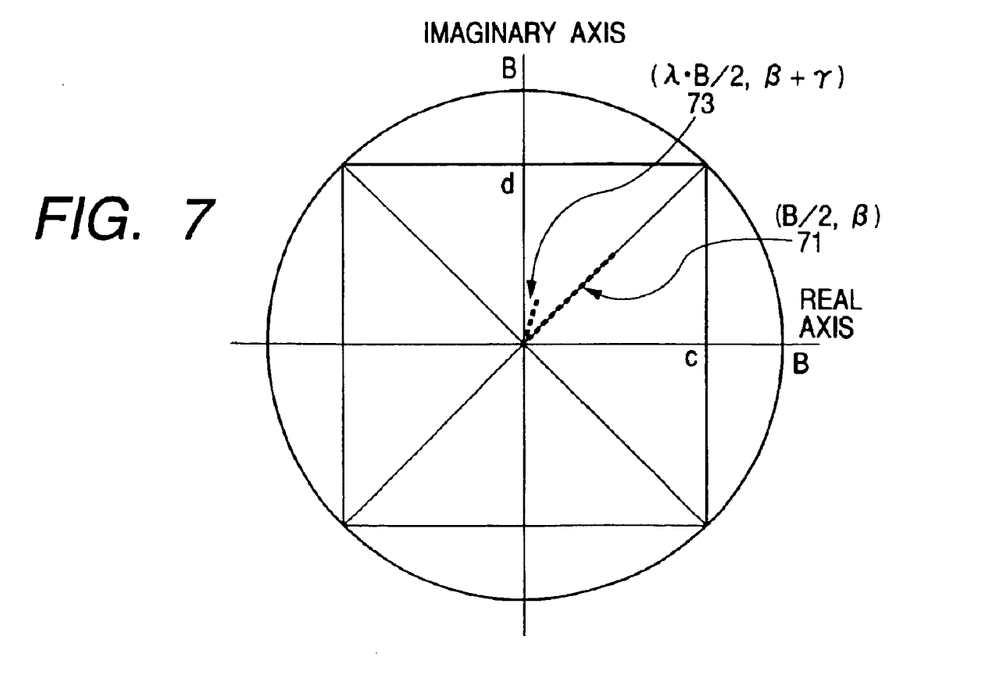
FIG. 7 is a diagram of a complex plane in which vectors corresponding to a subcarrier are illustrated.

The first and third terms in the equation (7) denote vectors 71 and 73 rotating at the angular velocity "$-\omega_n t$" which are shown in FIG. 7. The first-term vector 71 in FIG. 7 has an amplitude "B/2" and an angle "$\beta$" from the real axis. The third-term vector 73 in FIG. 7 has an amplitude "$\lambda \cdot B/2$" and an angle "$\beta+\gamma$" from the real axis.

Figure 8:
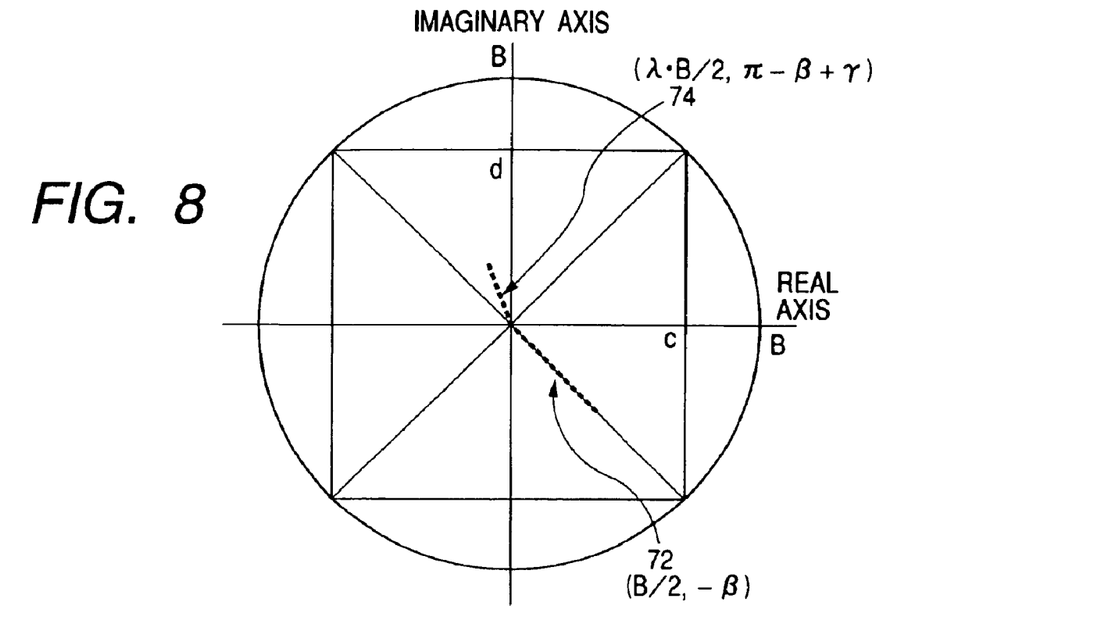
FIG. 8 is a diagram of a complex plane in which vectors corresponding to a subcarrier are illustrated.

The second and fourth terms in the equation (7) denote vectors 72 and 74 rotating at the angular velocity "$\omega_n t$" which are shown in FIG. 8. The second-term vector 72 in FIG. 8 has an amplitude "B/2" and an angle "$-\beta$" from the real axis. The fourth-term vector 74 in FIG. 8 has an amplitude "$\lambda \cdot B/2$" and an angle "$-(\beta+\gamma)$" from the real axis. The fourth-term vector 74 exists in the second quadrant of the two-dimensional plane.

The first-term vector 71 in FIG. 7 and the second-term vector 72 in FIG. 8 correspond to the real-part signal expressed by the first term of the equation (2), while the third-term vector 73 in FIG. 7 and the fourth-term vector 74 in FIG. 8 correspond to the imaginary-part signal expressed by the second term of the equation (2).

The previously-mentioned amplitude error ("$\lambda$" differs from "1") and phase error ("$\gamma$" differs from "0") relate to the third and fourth terms in the equations (6) and (7). The data mapping is designed to compensate for the amplitude error "$\lambda$" and the phase error "$\gamma$". Specifically, in the case where a corrective signal having an amplitude of a factor of "$1/\lambda$" and a phase advance of "$\gamma$" is given with respect to the third and fourth terms in the equation (6), the digital quadrature modulator 15 multiplies the amplitude by "$\lambda$" and delays the phase by "$\gamma$" so that a signal having a nullified amplitude error and a nullified phase error will be generated regarding the third and fourth terms of the equation (6).

The corrective signal for the signal represented by the equation (6) is expressed as follows.

$$(\tfrac{1}{2})Ae^{j\alpha}e^{j\omega_n t}+(\tfrac{1}{2})Ae^{-j\alpha}e^{-j\omega_n t}+\{1/(2\lambda)\}Ae^{j(\alpha+\gamma)}e^{j\omega_n t}-\{1/(2\lambda)\}Ae^{-j(\alpha+\gamma)}e^{-j\omega_n t} \quad (8)$$

Similarly, a corrective signal for the signal represented by the equation (7) is expressed as follows.

$$(\tfrac{1}{2})Be^{j\beta}e^{-j\omega_n t}+(\tfrac{1}{2})Be^{-j\beta}e^{j\omega_n t}+\{1/(2\lambda)\}Be^{j(\beta-\gamma)}e^{-j\omega_n t}-\{1/(2\lambda)\}Be^{-j(\beta-\gamma)}e^{j\omega_n t} \quad (9)$$

The corrective signals expressed by the equations (8) and (9) correspond to the cancel of the amplitude error "$\lambda$" and the phase error "$\gamma$" from the before-correction signals given by the equations (3) and (4). Accordingly, it is possible to generate error-free modulation-resultant digital signals expressed by the equations (1) and (2).

Figure 9:
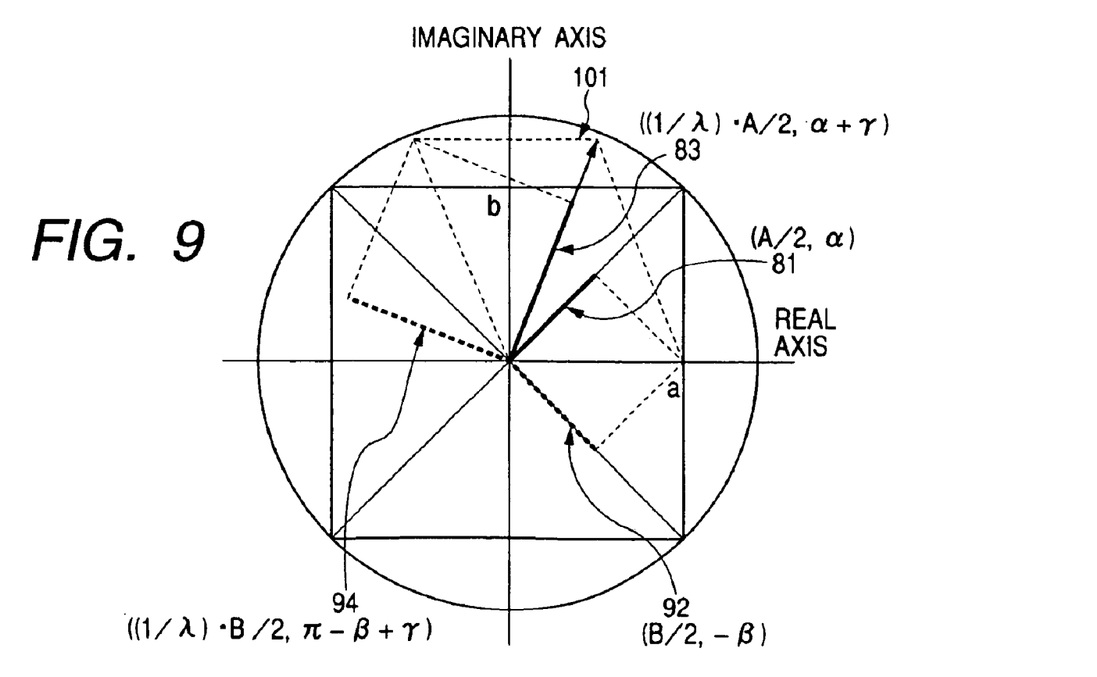
FIG. 9 is a diagram of a complex plane in which vectors corresponding to a subcarrier are illustrated.

FIG. 9 shows a mapping point (a signal point) for enabling the digital quadrature modulator 15 to generate an error-compensated modulation-resultant digital signal having the angular velocity "$\omega_n t$". In FIG. 9, vectors 81 and 83 correspond to the first and third terms of the equation (8) while vectors 92 and 94 correspond to the second and fourth terms of the equation (9). A final vector 101 representing a correction-resultant signal point is calculated by summing the vectors 81, 83, 92, and 94. The vectors 81 and 83 correspond to the terms containing "$e^{j\omega_n t}$". Also, the vectors 92 and 94 correspond to the terms containing "$e^{j\omega_n t}$". Accordingly, the final vector 101 is equal to the resultant of the vectors 81, 83, 92, and 94 which rotate at the angular velocity "$\omega_n t$". Specifically, the final vector 101 is calculated by summing the resultant of the vectors 81 and 92 and the resultant of the vectors 83 and 94. The correction-resultant signal point represented by the final vector 101 is assigned to the subcarrier which rotates at the angular velocity "$\omega_n t$".

Figure 10:
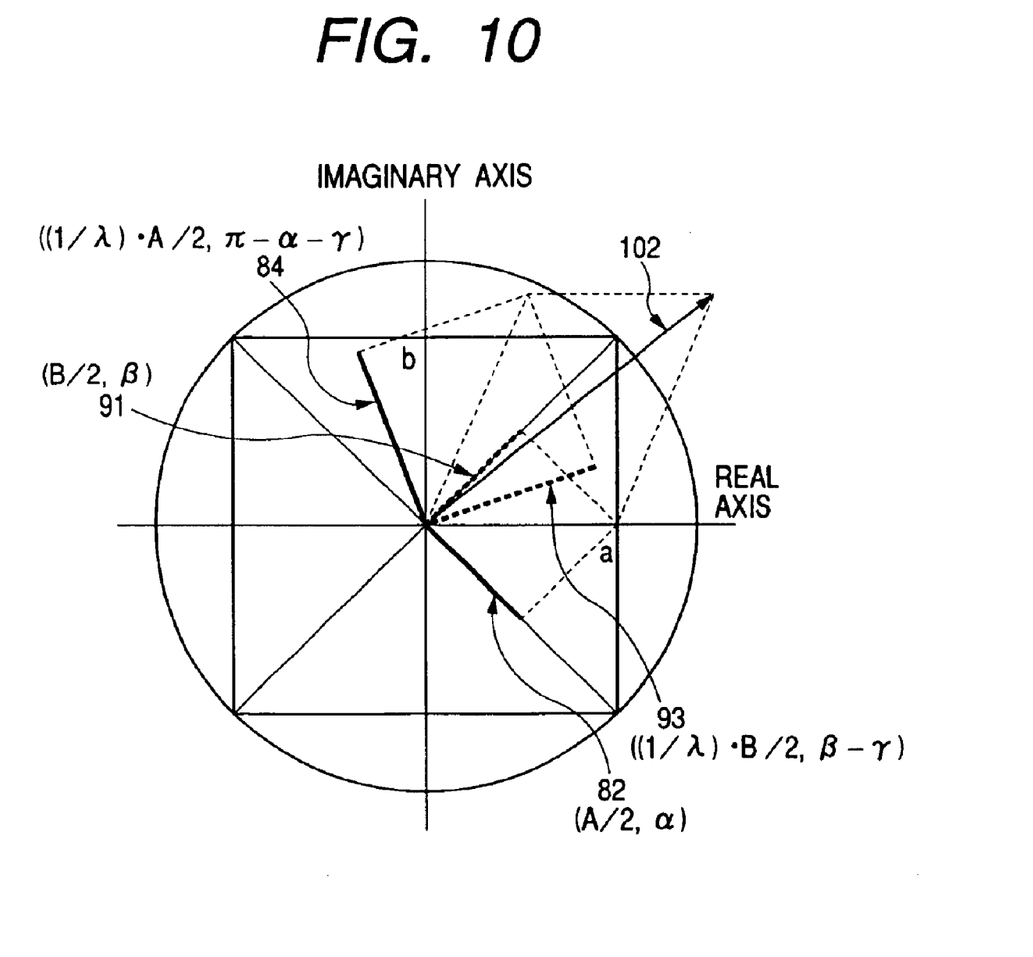
FIG. 10 is a diagram of a complex plane in which vectors corresponding to a subcarrier are illustrated.

FIG. 10 shows a mapping point (a signal point) for enabling the digital quadrature modulator 15 to generate an error-compensated modulation-resultant digital signal having the angular velocity "$-\omega_n t$". In FIG. 10, vectors 82 and 84 correspond to the second and fourth terms of the equation (8) while vectors 91 and 93 correspond to the first and third terms of the equation (9). A final vector 102 representing a correction-resultant signal point is calculated by summing the vectors 82, 84, 91, and 93. The vectors 82 and 84 correspond to the terms containing "$e^{-j\omega_n t}$". Also, the vectors 91 and 93 correspond to the terms containing "$e^{-j\omega_n t}$". Accordingly, the final vector 102 is equal to the resultant of the vectors 82, 84, 91, and 93 which rotate at the angular velocity "$-\omega_n t$". The correction-resultant signal point represented by the final vector 102 is assigned to the subcarrier which rotates at the angular velocity "$-\omega_n t$".

As understood from the previous description, in order to compensate for the phase error and the amplitude error caused by the digital quadrature modulator 15 to generate the error-free subcarriers "$A \cdot \cos(+\omega_n t+\alpha)+j \cdot A \cdot \sin(+\omega_n t+\alpha)$" and "$B \cdot \cos(-\omega_n t+\beta)+j \cdot B \cdot \sin(-\omega_n t+\beta)$", the signal points used by the data mapping are chosen to correspond to subcarriers "$A \cdot \cos(+\omega_n t+\alpha)+j \cdot (1/\lambda) \cdot A \cdot \sin(+\omega_n t+\alpha+\gamma)$" and "$B \cdot \cos(-\omega_n t+\beta)+j \cdot (1/\lambda) \cdot B \cdot \sin(-\omega_n t+\beta-\gamma)$".

The sum of the coefficients in the terms of the equations (8) and (9) which relate to the subcarrier having the angular frequency "$+\omega_n$" is given as follows.

$$(\tfrac{1}{2})Ae^{j\alpha}+(\tfrac{1}{2})Be^{-j\beta}+\{1/(2\lambda)\}Ae^{j(\alpha+\gamma)}-\{1/(2\lambda)\}Be^{-(\beta-\gamma)} \quad (10)$$

The equation (10) is rewritten as follows.

$$Re(+\omega_n)+jIm(+\omega_n) \quad (11)$$

where:

$$Re(+\omega_n)=(\tfrac{1}{2})A\cos\alpha+(\tfrac{1}{2})B\cos\beta+\{1/(2\lambda)\}A\cos(\alpha+\gamma)-\{1/(2\lambda)\}B\cos(\beta-\gamma) \quad (12)$$

$$Im(+\omega_n)=(\tfrac{1}{2})A\sin\alpha-(\tfrac{1}{2})B\sin\beta+\{1/(2\lambda)\}A\sin(\alpha+\gamma)+\{1/(2\lambda)\}B\sin(\beta-\gamma) \quad (13)$$

The value $Re(+\omega_n)$ denoted by the equation (12) is assigned to the real part for the subcarrier having the angular frequency "$+\omega_n$". The value $Im(+\omega_n)$ denoted by the equation (13) is assigned to the imaginary part for the subcarrier having the angular frequency "$+\omega_n$".

The sum of the coefficients in the terms of the equations (8) and (9) which relate to the subcarrier having the angular frequency "$-\omega_n$" is given as follows.

$$(\tfrac{1}{2})Be^{j\beta}+(\tfrac{1}{2})Ae^{-j\alpha}+\{1/(2\lambda)\}Be^{j(\beta-\gamma)}-\{1/(2\lambda)\}Ae^{-j(\alpha+\gamma)} \quad (14)$$

The equation (13) is rewritten as follows.

$$Re(-\omega_n)+jIm(-\omega_n) \quad (15)$$

where:

$$Re(-\omega_n)=(\tfrac{1}{2})B\cos\beta+(\tfrac{1}{2})A\cos\alpha+\{1/(2\lambda)\}B\cos(\beta-\gamma)-\{1/(2\lambda)\}A\cos(\alpha+\gamma) \quad (16)$$

$$Im(-\omega_n)=(\tfrac{1}{2})B\sin\beta-(\tfrac{1}{2})A\sin\alpha+\{1/(2\lambda)\}B\sin(\beta-\gamma)+\{1/(2\lambda)\}A\sin(\alpha+\gamma) \quad (17)$$

The value $Re(-\omega_n)$ denoted by the equation (16) is assigned to the real part for the subcarrier having the angular frequency "$-\omega_n$". The value $Im(-\omega_n)$ denoted by the equation (17) is assigned to the imaginary part for the subcarrier having the angular frequency "$-\omega_n$".

Since the error caused by the digital quadrature modulator 15 relates to the calculation time for the imaginary-part signals, the phase error is present while the amplitude error is basically absent. Therefore, the value "$\lambda$" is set to "1" while the value "$\gamma$" differs from "0". In the case of QPSK, the amplitudes "A" and "B" are equal to each other. Thus, the equations (12), (13), (16), and (17) are rewritten as follows.

$$Re(+\omega_n)=(\tfrac{1}{2})A\{\cos\alpha+\cos\beta+\cos(\alpha+\gamma)-\cos(\beta-\gamma)\} \quad (18)$$

$$Im(+\omega_n)=(\tfrac{1}{2})A\{\sin\alpha-\sin\beta+\sin(\alpha+\gamma)+\sin(\beta-\gamma)\} \quad (19)$$

$$Re(-\omega_n)=(\tfrac{1}{2})A\{\cos\beta+\cos\alpha+\cos(\beta-\gamma)-\cos(\alpha+\gamma)\} \quad (20)$$

$$Im(-\omega_n)=(\tfrac{1}{2})A\{\sin\beta-\sin\alpha+\sin((\beta-\gamma)+\sin(\alpha+\gamma)\} \quad (21)$$

In the case of QPSK, each of the angles "$\alpha$" and "$\beta$" assumes one of $\pi/4$, $3\pi/4$, $5\pi/4$, and $7\pi/4$. The values $Re(+\omega_n)$, $Im(+\omega_n)$, $Re(-\omega_n)$, and $Im(-\omega_n)$ expressed by the equations (18)–(21) depend on the angles "$\alpha$" and "$\beta$" as follows.

When the angles "$\alpha$" and "$\beta$" are equal to $\pi/4$, the values $Re(+\omega_n)$, $Im(+\omega_n)$, $Re(-\omega_n)$, and $Im(-\omega_n)$ are equal to "$1-\sin\gamma$", "$\cos\gamma$", "$1+\sin\gamma$", and "$\cos\gamma$" respectively.

When the angles "$\alpha$" and "$\beta$" are equal to $\pi/4$ and $3\pi/4$ respectively, the values $Re(+\omega_n)$, $Im(+\omega_n)$, $Re(-\omega_n)$, and $Im(-\omega_n)$ are equal to "$\sqrt{2}\cos(\pi/4+\gamma)$", "$\sqrt{2}\sin(\pi/4+\gamma)$", "$\sqrt{2}\cos(3\pi/4-\gamma)$", and "$\sqrt{2}\sin(3\pi/4-\gamma)$" respectively.

When the angles "$\alpha$" and "$\beta$" are equal to $\pi/4$ and $5\pi/4$ respectively, the values $Re(+\omega_n)$, $Im(+\omega_n)$, $Re(-\omega_n)$, and $Im(-\omega_n)$ are equal to "$\cos\gamma$", "$1+\sin\gamma$", "$-\cos\gamma$", and "$-1+\sin\gamma$" respectively.

When the angles "$\alpha$" and "$\beta$" are equal to $\pi/4$ and $7\pi/4$ respectively, the values $Re(+\omega_n)$, $Im(+\omega_n)$, $Re(-\omega_n)$, and $Im(-\omega_n)$ are equal to "1", "1", "1", and "$-1$" respectively.

When the angles "$\alpha$" and "$\beta$" are equal to $3\pi/4$ and $\pi/4$ respectively, the values $Re(+\omega_n)$, $Im(+\omega_n)$, $Re(-\omega_n)$, and $Im(-\omega_n)$ are equal to "$\sqrt{2}\cos(3\pi/4+\gamma)$", "$\sqrt{2}\sin(3\pi/4+\gamma)$", "$\sqrt{2}\cos(\pi/4-\gamma)$", and "$\sqrt{2}\sin(\pi/4-\gamma)$" respectively.

When the angles "$\alpha$" and "$\beta$" are equal to $3\pi/4$, the values $Re(+\omega_n)$, $Im(+\omega_n)$, $Re(-\omega_n)$, and $Im(-\omega_n)$ are equal to "$-1-\sin\gamma$", "$\cos\gamma$", "$-1+\sin\gamma$", and "$\cos\gamma$" respectively.

When the angles "$\alpha$" and "$\beta$" are equal to $3\pi/4$ and $5\pi/4$ respectively, the values $Re(+\omega_n)$, $Im(+\omega_n)$, $Re(-\omega_n)$, and $Im(-\omega_n)$ are equal to "$-1$", "1", "$-1$", and "$-1$" respectively.

When the angles "$\alpha$" and "$\beta$" are equal to $3\pi/4$ and $7\pi/4$ respectively, the values $Re(+\omega_n)$, $Im(+\omega_n)$, $Re(-\omega_n)$, and $Im(-\omega_n)$ are equal to "$-\cos\gamma$", "$1-\sin\gamma$", "$\cos\gamma$", and "$-1-\sin\gamma$" respectively.

When the angles "$\alpha$" and "$\beta$" are equal to $5\pi/4$ and $\pi/4$ respectively, the values $Re(+\omega_n)$, $Im(+\omega_n)$, $Re(-\omega_n)$, and $Im(-\omega_n)$ are equal to "$\cos\gamma$", "$-1-\sin\gamma$", "$\cos\gamma$", and "$1-\sin\gamma$" respectively.

When the angles "$\alpha$" and "$\beta$" are equal to $5\pi/4$ and $3\pi/4$ respectively, the values $Re(+\omega_n)$, $Im(+\omega_n)$, $Re(-\omega_n)$, and $Im(+\omega_n)$ are equal to "$-1$", "$-1$", "$-1$", and "1" respectively.

When the angles "$\alpha$" and "$\beta$" are equal to $5\pi/4$, the values $Re(+\omega_n)$, $Im(+\omega_n)$, $Re(-\omega_n)$, and $Im(-\omega_n)$ are equal to "$-1+\sin\gamma$", "$-\cos\gamma$", "$-1-\sin\gamma$", and "$-\cos\gamma$" respectively.

When the angles "$\alpha$" and "$\beta$" are equal to $5\pi/4$ and $7\pi/4$ respectively, the values $Re(+\omega_n)$, $Im(+\omega_n)$, $Re(-\omega_n)$, and $Im(-\omega_n)$ are equal to "$\sqrt{2}\cos(5\pi/4+\gamma)$", "$\sqrt{2}\sin(5\pi/4+\gamma)$", "$\sqrt{2}\cos(7\pi/4-\gamma)$", and "$\sqrt{2}\sin(7\pi/4-\gamma)$" respectively.

When the angles "$\alpha$" and "$\beta$" are equal to $7\pi/4$ and $\pi/4$ respectively, the values $Re(+\omega_n)$, $Im(+\omega_n)$, $Re(-\omega_n)$, and $Im(-\omega_n)$ are equal to "1", "$-1$", "1", and "1" respectively.

When the angles "$\alpha$" and "$\beta$" are equal to $7\pi/4$ and $3\pi/4$ respectively, the values $Re(+\omega_n)$, $Im(+\omega_n)$, $Re(-\omega_n)$, and $Im(-\omega_n)$ are equal to "$\cos\gamma$", "$-1+\sin\gamma$", "$-\cos\gamma$", and "$1+\sin\gamma$" respectively.

When the angles "$\alpha$" and "$\beta$" are equal to $7\pi/4$ and $5\pi/4$ respectively, the values $Re(+\omega_n)$, $Im(+\omega_n)$, $Re(-\omega_n)$, and $Im(-\omega_n)$ are equal to "$\sqrt{2}\cos(7\pi/4+\gamma)$", "$\sqrt{2}\sin(7\pi/4+\gamma)$", "$\sqrt{2}\cos(5\pi/4-\gamma)$", and "$\sqrt{2}\sin(5\pi/4-\gamma)$" respectively.

When the angles "$\alpha$" and "$\beta$" are equal to $7\pi/4$, the values $Re(+\omega_n)$, $Im(+\omega_n)$, $Re(-\omega_n)$, and $Im(-\omega_n)$ are equal to "$1+\sin\gamma$", "$-\cos\gamma$", "$1-\sin\gamma$", and "$-\cos\gamma$" respectively.

It should be noted that QPSK may be replaced by BPSK (binary phase-shift keying) or multi-value QAM. The previously-mentioned compensation for the modulation error caused by the timing phase difference can be applied to any modulation system in which a positive subcarrier frequency and a negative subcarrier frequency are set relative to a central frequency, and information pieces to be transmitted are assigned to signal points of the positive and negative subcarriers.

In the case where both the phase error and the amplitude error are present so that the value "λ" differs from "1" and the value "γ" differs from "0", the correction-resultant signal points used by the data mapping are determined on the basis of the equations (12), (13), (16), and (17). In this case, it is possible to correct both the phase error and the amplitude error.

It should be noted that the data selector 15E in the digital quadrature modulator 15 may generate the recurrence of "Qn", "$I_n$", "$-Q_n$", and "$-I_n$" or the recurrence of "$-Q_n$", "$-I_n$", "Qn", and "$I_n$" instead of the recurrence of "$I_n$", "$-Q_n$", "$-I_n$", and "Qn".

What is claimed is:

1. In an orthogonal frequency division multiplexing modulation system, a method of generating a transmission signal, comprising the steps of:

determining non-compensation signal points in a two-dimensional plane without considering a signal error caused by digital quadrature modulation, the determined non-compensation signal points corresponding to orthogonal frequency division multiplexing subcarriers having positive and negative angular frequencies, the two-dimensional plane being defined by a real axis and an imaginary axis, the real axis corresponding to real-part signal components, the imaginary axis corresponding to imaginary-parts signal components;

determining compensation signal points in the two-dimensional plane on the basis of the determined non-compensation signal points and in response to a signal error caused by digital quadrature modulation if the non-compensation signal points are used, the compensation signal points corresponding to the orthogonal frequency division multiplexing subcarriers having the positive and negative angular frequencies, wherein the compensation signal points corresponding to the orthogonal frequency division multiplexing subcarriers having the positive angular frequencies and the compensation signal points corresponding to the orthogonal frequency division multiplexing subcarriers having the negative angular frequencies are in a predetermined relation;

sequentially assigning digital information signal pieces to one of the compensation signal points in response to contents of the digital information signal pieces; and subjecting the digital information pieces to a modulation process including digital quadrature modulation in response to the assignment given by the assigning step to generate a radio-frequency transmission signal including an orthogonal frequency division multiplexed signal containing the orthogonal frequency division multiplexing subcarriers.

2. A method as recited in claim 1, wherein the compensation signal points provide compensation for an error in the radio-frequency transmission signal which is caused by one of a phase difference between an in-phase signal and a quadrature signal, an amplitude difference between the in-phase signal and the quadrature signal, and an error in a quadrature relation between the in-phase signal and the quadrature signal.

3. A method as recited in claim 1, wherein the compensation signal points provide compensation for an error in the radio-frequency transmission signal which is caused by a timing difference between an in-phase signal and a quadrature signal.

4. A method of generating a transmission signal, comprising the steps of:

determining first non-compensation signal points in a two-dimensional plane without considering a signal error caused by digital quadrature modulation, the two-dimensional plane being defined by a real axis and an imaginary axis, the real axis corresponding to real-part signal components, the imaginary axis corresponding to imaginary-part signal components;

determining second non-compensation signal points in the two-dimensional plane without considering the signal error caused by digital quadrature modulation;

determining first compensation signal points in the two-dimensional plane for a first subcarrier on the basis of the first non-compensation signal points and in response to a signal error caused by digital quadrature modulation if the first non-compensation signal points are used;

determining second compensation signal points in the two-dimensional plane for a second subcarrier on the basis of the second non-compensation signal points and in response to a signal error caused by digital quadrature modulation if the second non-compensation signal points are used, the second subcarrier being equal in frequency to the first subcarrier and being different in polarity from the first subcarrier;

sequentially assigning first digital information signal pieces to one of the first compensation signal points in response to contents of the first digital information signal pieces;

sequentially assigning second digital information signal pieces to one of the second compensation signal points in response to contents of the second digital information signal pieces; and subjecting the first digital information pieces and the second digital information pieces to a modulation process including digital quadrature modulation in response to the assignments given by the assigning steps to generate a radio-frequency transmission signal containing the first and second subcarriers.

5. In an orthogonal frequency division multiplexing modulation system, an apparatus for generating a transmission signal, comprising:

means for determining non-compensation signal points in a two-dimensional plane without considering a signal error caused by digital quadrature modulation, the determined non-compensation signal points corresponding to orthogonal frequency division multiplexing subcarriers having positive and negative angular frequencies, the two-dimensional plane being defined by a real axis and an imaginary axis, the real axis corresponding to real-part signal components, the imaginary axis corresponding to imaginary-part signal components;

means for determining compensation signal points in the two-dimensional plane on the basis of the determined non-compensation signal points and in response to a signal error caused by digital quadrature modulation if the non-compensation signal points are used, the compensation signal points corresponding to the orthogonal frequency division multiplexing subcarriers having the positive and negative angular frequencies, wherein the compensation signal points corresponding to the orthogonal frequency division multiplexing subcarriers having the positive angular frequencies and the compensation signal points corresponding to the orthogonal frequency division multiplexing subcarriers having the negative angular frequencies are in a predetermined relation;

means for sequentially assigning digital information signal pieces to one of the compensation signal points in response to contents of the digital information signal pieces; and means for subjecting the digital information pieces to a modulation process including digital quadrature modulation in response to the assignment given by the assigning means to generate a radio-frequency transmission signal including an orthogonal frequency division multiplexed signal containing the orthogonal frequency division multiplexing subcarriers.

6. In an orthogonal frequency division multiplexing modulation system, an apparatus for generating a transmission signal, comprising:

first means for storing information representing assignment of states of a signal piece to predetermined signal points responsive to an estimated signal error caused by digital quadrature modulation in the absence of correction, the predetermined signal points being separated into groups including a first group corresponding to a first subcarrier and a second group corresponding to a second subcarrier different in frequency from the first subcarrier;

second means for assigning a first input information signal piece to one of the signal points in the first group in response to a state of the first input information signal piece according to the information stored in the first means to convert the first input information signal piece into first and second baseband signal pieces;

third means for subjecting the first and second baseband signal pieces generated by the second means to a modulation process including digital quadrature modulation to convert the first and second baseband signal pieces into a piece of a first modulation-resultant transmission signal from which a signal error caused by the digital quadrature modulation is removed, the first modulation-resultant transmission signal containing the first subcarrier;

said second means for assigning a second input information signal piece to one of the signals points in the second group in response to a state of the second input information signal piece according to the information stored in the first means to convert the second input information signal piece into third and fourth baseband signal pieces;

said third means for subjecting the third and fourth baseband signal pieces generated by the second means to a modulation process including digital quadrature modulation to convert the third and fourth baseband signal pieces into a piece of a second modulation-resultant transmission signal from which a signal error caused by the digital quadrature modulation is removed, the second modulation-resultant transmission signal containing the second subcarrier; and fourth means for combining the first and second modulation-resultant transmission signal into an orthogonal frequency division multiplexed signal having the first and second subcarriers.

7. In an orthogonal frequency division multiplexing modulation system, a method of generating a transmission signal, comprising the steps of:

determining first non-compensation signal points in a two-dimensional plane without considering a signal error caused by digital quadrature modulation, the two-dimensional plane being defined by a real axis and an imaginary axis, the real axis corresponding to real-part signal components, the imaginary axis corresponding to imaginary-part signal components;

determining second non-compensation signal points in the two-dimensional plane without considering the signal error caused by digital quadrature modulation;

determining first compensation signal points in the two-dimensional plane for each of a plurality of first subcarriers on the basis of the first non-compensation signal points and in response to a signal error caused by digital quadrature modulation if the first non-compensation signal points are used, the first subcarriers having different frequencies respectively;

determining second compensation signal points in the two-dimensional plane for each of a plurality of second subcarriers on the basis of the second non-compensation signal points and in response to a signal error caused by digital quadrature modulation if the second non-compensation signal points are used, wherein each second subcarrier is equal in frequency to a respective first subcarrier and is different in polarity from the respective first subcarrier;

sequentially assigning first digital information signal pieces to one of the first compensation signal points in response to contents of the first digital information signal pieces;

sequentially assigning second digital information signal pieces to one of the second compensation signal points in response to contents of the second digital information signal pieces; and subjecting the first digital information pieces and the second digital information pieces to a modulation process including digital quadrature modulation in response to the assignments given by the assigning steps to generate a radio-frequency transmission signal including an orthogonal frequency division multiplexed signal containing the first and second subcarriers.

* * * * *